(12) United States Patent
Piana et al.

(10) Patent No.: US 11,450,246 B2
(45) Date of Patent: Sep. 20, 2022

(54) MOBILE PRODUCT MANUFACTURING DEMONSTRATION, APPARATUS AND METHOD

(71) Applicant: Piana Nonwovens, LLC., Cartersville, GA (US)

(72) Inventors: Andrea Piana, Cartersville, GA (US); Michael Stephen DeFranks, Cartersville, GA (US); Andy Dean Hollis, Cartersville, GA (US)

(73) Assignee: PIANA NONWOVENS, LLC., Cartersville, GA (US)

( * ) Notice: Subject to any disclaimer, the term of this patent is extended or adjusted under 35 U.S.C. 154(b) by 136 days.

(21) Appl. No.: 17/161,754

(22) Filed: Jan. 29, 2021

(65) Prior Publication Data

US 2021/0241662 A1 Aug. 5, 2021

Related U.S. Application Data

(60) Provisional application No. 62/968,327, filed on Jan. 31, 2020.

(51) Int. Cl.
*G09F 21/04* (2006.01)
*G06Q 30/02* (2012.01)

(52) U.S. Cl.
CPC ........... *G09F 21/048* (2013.01); *G06Q 30/02* (2013.01); *G09G 2380/10* (2013.01)

(58) Field of Classification Search
None
See application file for complete search history.

(56) References Cited

U.S. PATENT DOCUMENTS

| 2004/0194273 | A1 | 10/2004 | Yamakado et al. |
| 2007/0194273 | A1 | 7/2007 | Brock |
| 2011/0316298 | A1 | 12/2011 | Rampersad |

FOREIGN PATENT DOCUMENTS

WO 2005/118214 A1 12/2005

*Primary Examiner* — Nicholas J Lee
(74) *Attorney, Agent, or Firm* — WCF IP (57) ABSTRACT

A mobile product manufacturing demonstration, apparatus and method is intended to cut through the clutter and rise above the noise of typical marketing language and tactics, replacing the same with demonstrable, real-world demonstrations of how a producer is making a difference in terms of environmentally conscious manufacturing and good environmental stewardship. The mobile product manufacturing demonstration, apparatus and method includes a vehicle for transportation between rural townships and urban centers which itself is preferably battery powered, hydrogen powered, or powered by some other environmentally friendly mechanism. On board is a plurality of display stations which allow the public to interact with and/or manipulate materials used in the recycling and/or manufacturing process. Thus, the consumers will be able to see, hear, and feel (through touch and/or manipulation) how the products are made from recycled or recyclable materials.

16 Claims, 10 Drawing Sheets

MOBILE PRODUCT MANUFACTURING DEMONSTRATION, APPARATUS AND METHOD

CROSS-REFERENCE TO RELATED APPLICATIONS

This application claims priority to U.S. Ser. No. 62/968,327 filed Jan. 31, 2020. The complete contents of that application is herein incorporated by reference.

BACKGROUND

Sustainability has become a common thread in business strategy and those product manufacturers that demonstrate that they are responsible stewards of the environment are gaining traction with consumers and their buying decisions. While there has been plenty of conversation and press about consumer product companies who are making a difference, in general these claims are based upon trust and rarely demonstrated.

SUMMARY

Showing a consumer firsthand how a product can be manufactured responsibly and recycled at its end of life offers a unique and novel opportunity to create champions of your brand and brand ambassadors who will create awareness and increase sales through their testimonials, personal interactions and through social media. An aspect of this invention permits a company to demonstrate their vision for environmental and sustainable business practices by making this visible to consumers. This invention provides an opportunity for a company to demonstrate their point of difference with competitors, and their meaningfully unique approach to true cradle-to-cradle product development and manufacturing using a mobile product manufacturing and demonstration unit.

DETAILED DESCRIPTION

The mobile product manufacturing demonstration, apparatus and method have been designed to enable a product producer to tell their environmentally friendly, good stewardship of the earth and its resources, story to consumers in a meaningful, tangible way, and to enable the producers to bring their vision of the future to towns and cities everywhere. The mobile product manufacturing demonstration, apparatus and method elevates the game from today's strategies which are largely based on marketing hype and slick advertising campaigns to one where the environmentally conscious producer can ignite enthusiasm of consumers through demonstration of responsible manufacturing practices, product features and sustainable business practices.

Figure 1:
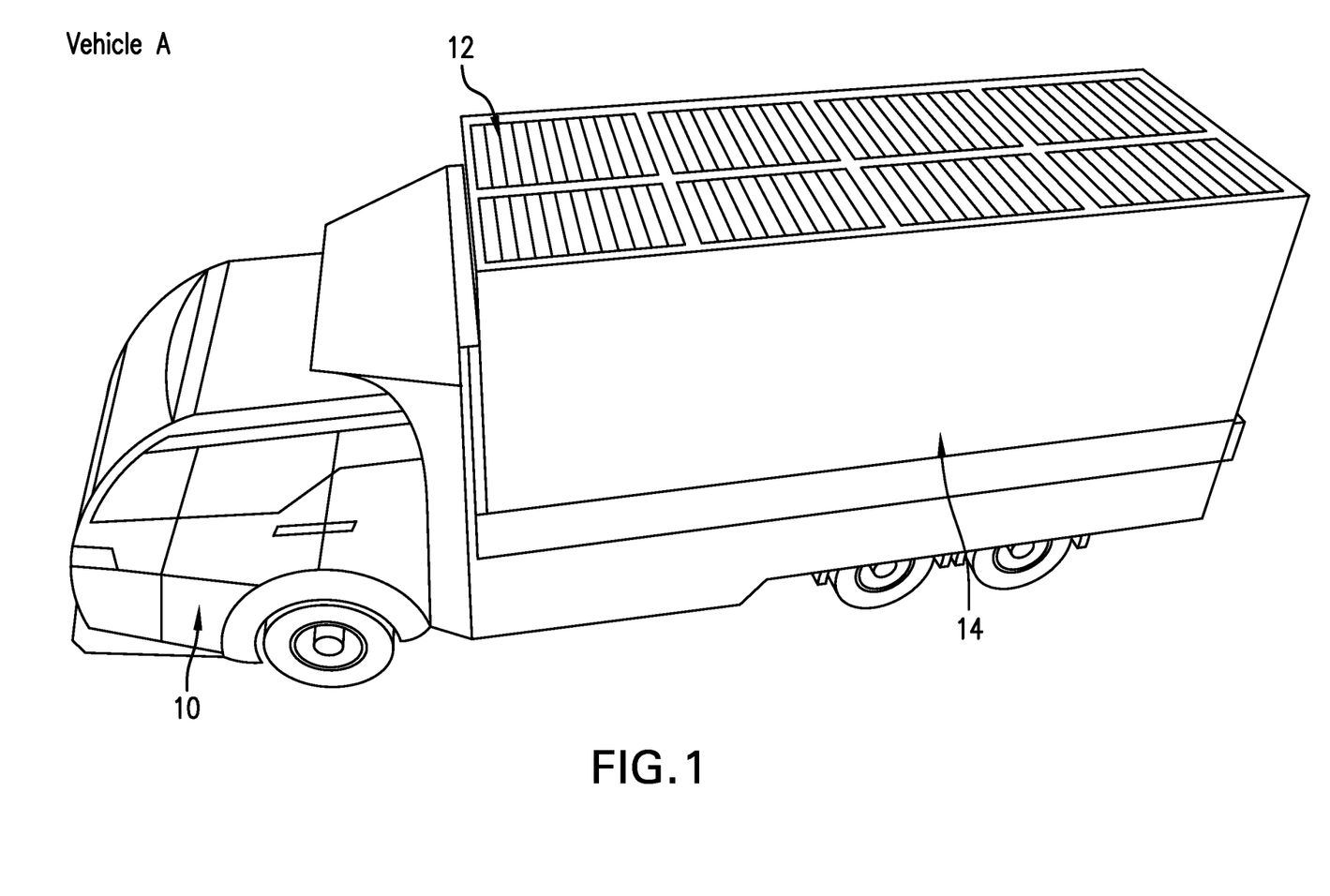
FIG. 1 is a schematic of one embodiment of a vehicle used in a mobile, interactive, platform for demonstrating production of products with minimized environmental impact.

FIG. 1 shows that one element of the mobile product manufacturing demonstration, apparatus and method is a vehicle 10 that can transport a plurality of demonstration stations between rural townships and urban centers. FIG. 1 shows the vehicle 10 as preferably being an environmentally friendly electric vehicle. However, it should be recognized that the mobile product manufacturing demonstration apparatus may be housed within a large vehicle 10 such as a bus, van, recreational vehicle, ten wheel truck, pick up truck, panel van, semi-truck, or similar mode of transportation. The preferred embodiment of the mobile demonstration unit would be a zero-emissions vehicle and powered by lithium-ion batteries, electric motors, hydrogen fuel cells and/or other means of zero-emissions drivetrains. In the ideal state, the lithium-ion batteries are recharged by photovoltaic panels 12 (solar panels). As shown in FIG. 1, when a truck is used, solar panels 12 may be positioned on the top of trailer to power the vehicle and/or the video displays used in the vehicle and/or the one or more display stations in the vehicle by, for example, supplying energy to lithium-ion batteries which are used to power the truck, the video displays, and/or the display stations. Other less-desirable, incremental iterations of the mobile demonstration unit may include low-emission powertrains such as a hybrid, biodiesel-electric engine or at minimum engines that use cleaner burning CNG or carbon-neutral biodiesel as fuel.

FIG. 1 also shows that the vehicle may also include a video wall 14 on its exterior. This video wall 14 may be used to provide instruction/entertainment to human subjects when the vehicle is parked at a fairgrounds or other center, and people are waiting to enter the vehicle to interact with the display stations therein.

Figure 2:
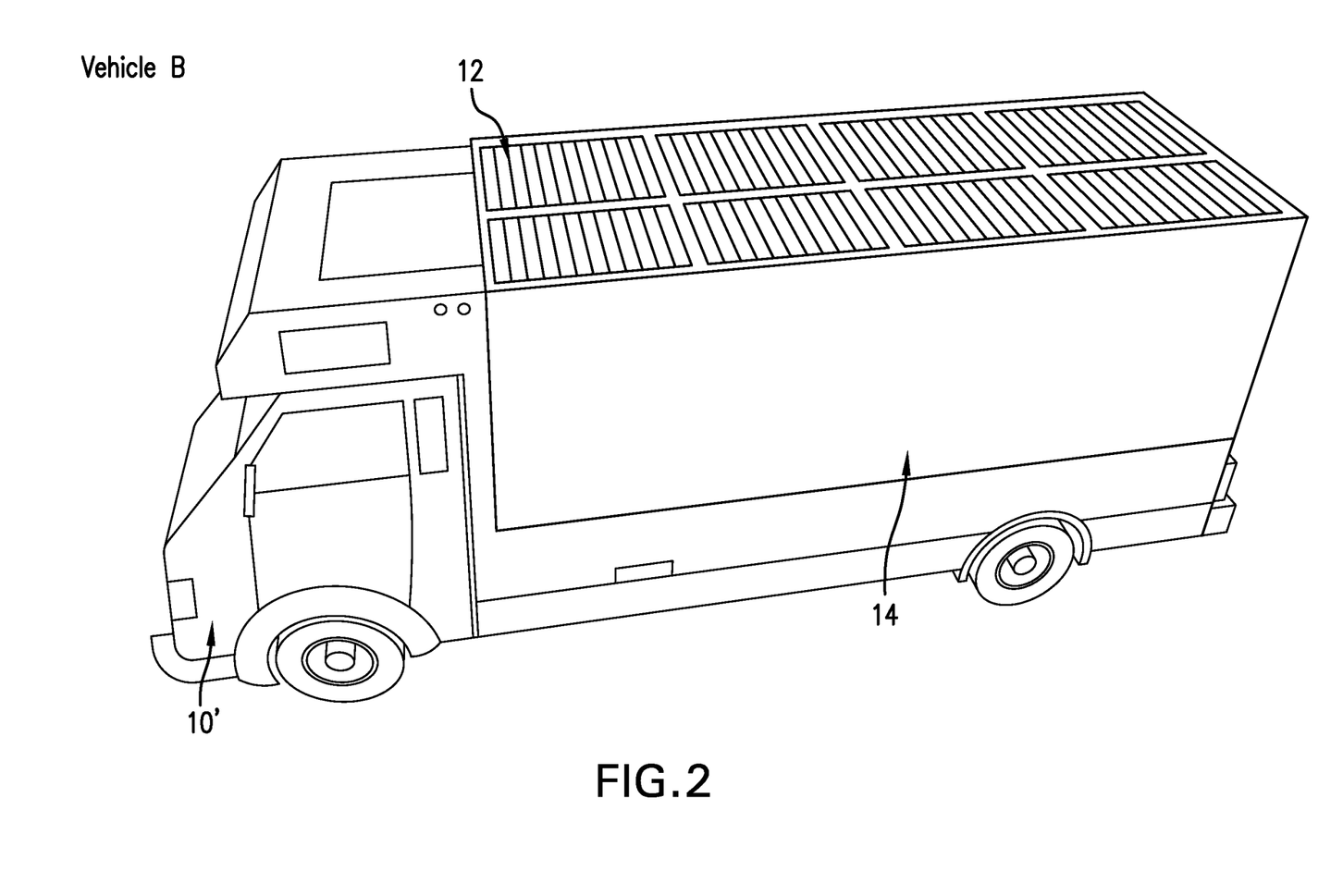
FIG. 2 is a schematic of another vehicle used in a mobile, interactive, platform for demonstrating production of products with minimized environmental impact.
Figure 3:
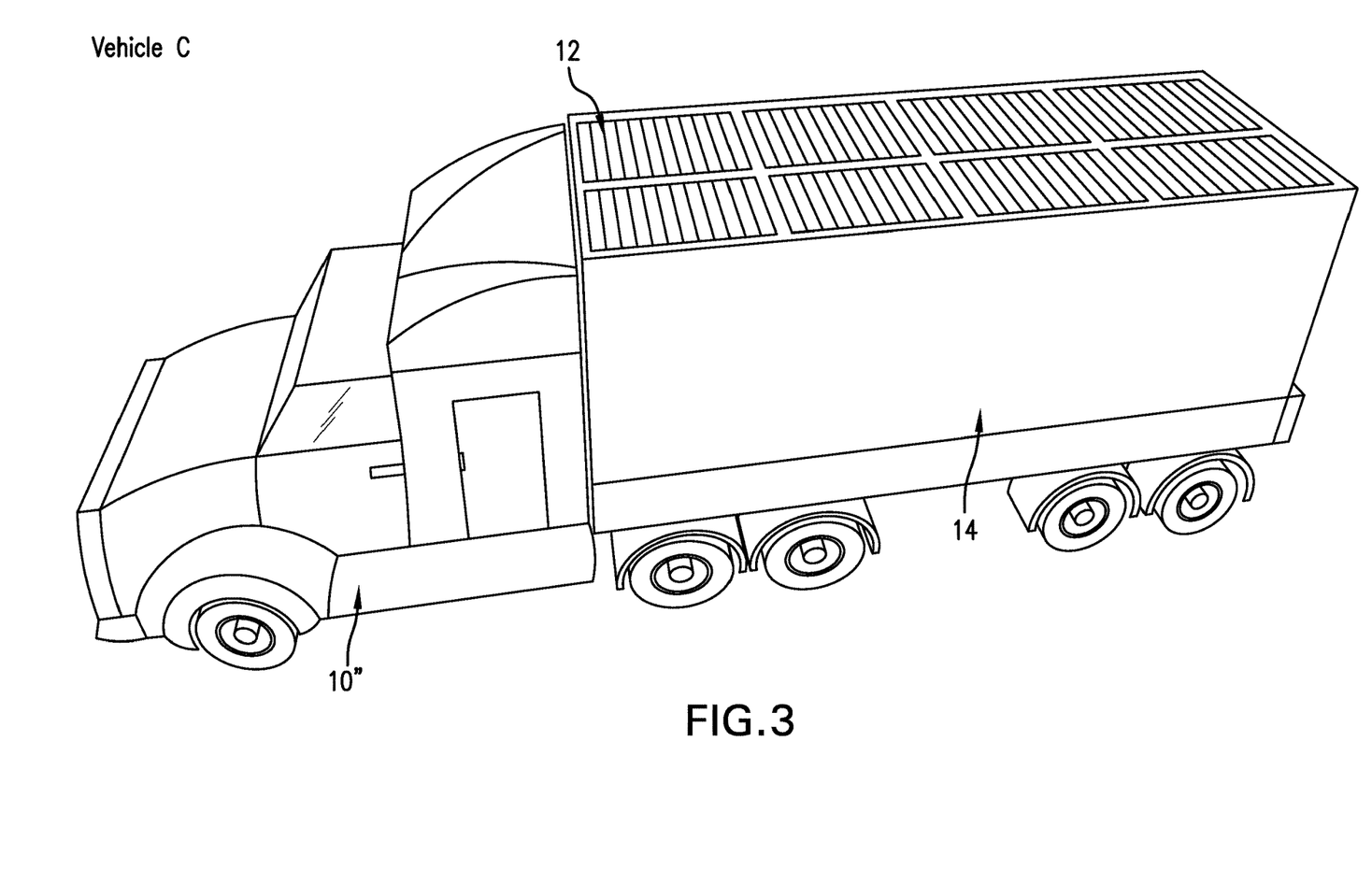
FIG. 3 is a schematic of yet another vehicle used in a mobile, interactive, platform for demonstrating production of products with minimized environmental impact.

FIGS. 2 and 3 show alternative vehicles which may be employed as the vehicle for transporting the demonstration stations. These include a panel van or RV 10' (FIG. 2) and an eighteen wheel big rig semi truck 10" (FIG. 3). Depending on how much is being transported (e.g., number and size of display stations) and or how many members of the public will be permitted onto the vehicle at any one time, the size of the vehicle used for the mobile product manufacturing demonstration, apparatus and method can vary considerably.

Figure 4A:
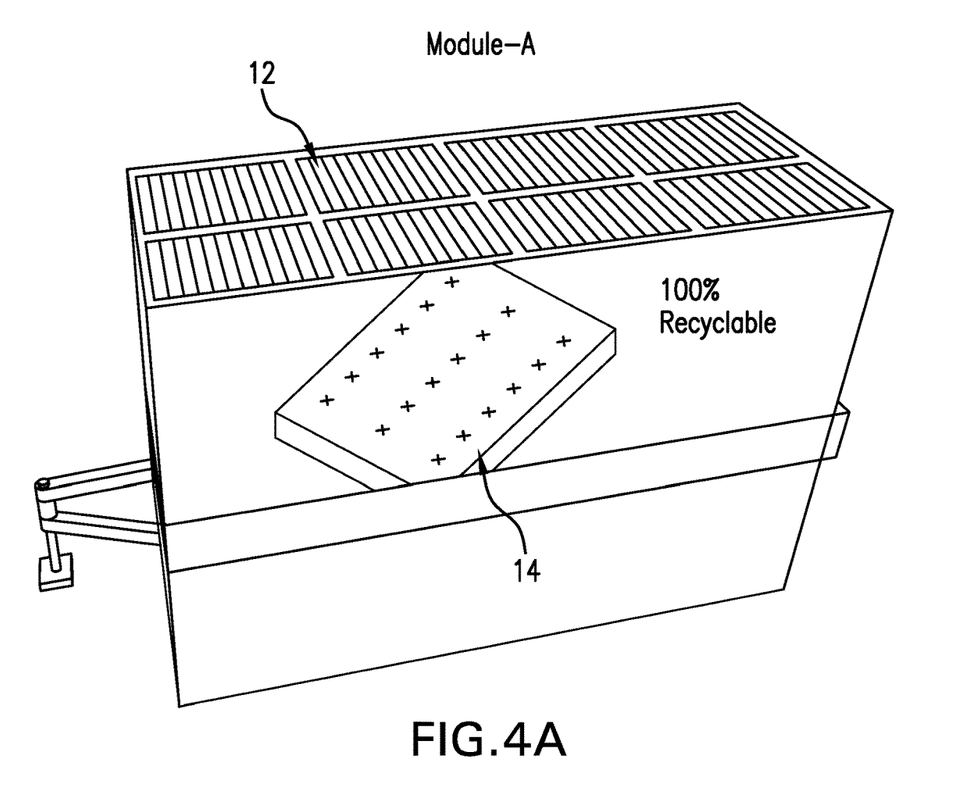
FIG. 4A is a schematic of a trailer detached from a vehicle, such as the one's depicted in FIGS. 1-3 or other vehicles such as and ordinary farm truck.

FIG. 4A shows an example of a plurality of display stations which may be loaded into the trailer of a vehicle (that is, in some embodiments, the trailers and the cab of the vehicles are separable). The mobile product manufacturing demonstration, apparatus and method is adaptable to be used for demonstrating the production of a variety of different products. Examples include mattresses, pillows, shoes, boxes, etc.

As shown in FIG. 4A, one station can show old used material 16 that will be recycled. This can include shredded components of mattresses, pillows, shoes, or the like. Preferably this station will be open and accessible to a human subject so that he or she can pick up, touch, and evaluate the materials of a product in a ready for recycling condition.

Figure 4B:
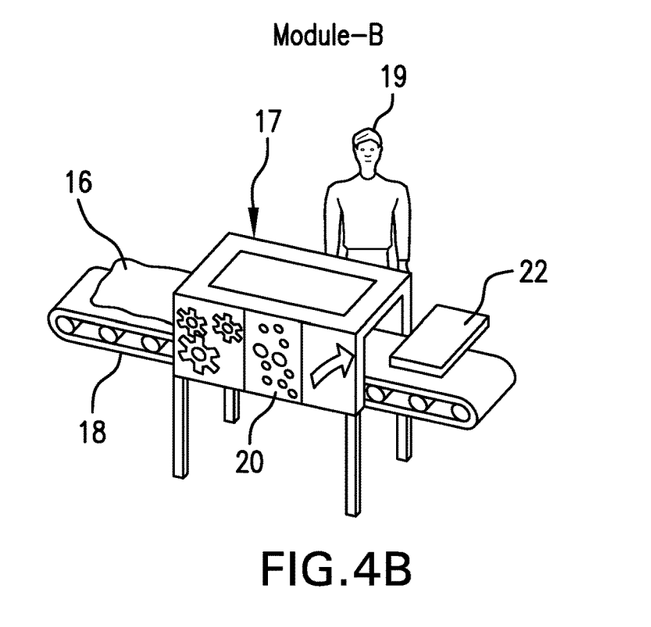
FIG. 4B is an example of a demonstration unit which fits within the vehicle.

FIG. 4B shows that a conveyor 18 transports the product in its ready for recycling condition (i.e., old used material 16) into recycling machinery 17. In some embodiments, the human subject 19 may be able to manipulate buttons or switches for transporting and/or treating the materials in a during recycling condition of the least one product while it is in the recycling machinery 17. Alternatively, and for safety or other reasons, the human subject 19 may be presented with videos 20 explaining and/or demonstrating the operations of the recycling machinery while the product is in a during recycling condition. Finally, a post-recycling condition of the product, e.g., a finished product 22 such as a mattress, shoe, or pillow, is presented to the user see, touch, and feel.

Elements of the design include, but are not limited to, demonstration of the product manufacturing process, demonstration of the most notable, differentiating product attributes, and demonstration of how the product is recycled back into the raw materials from which it was produced. As noted above, it is further envisioned that the entire process be powered by renewable energy sources such as solar power.

Figure 5:
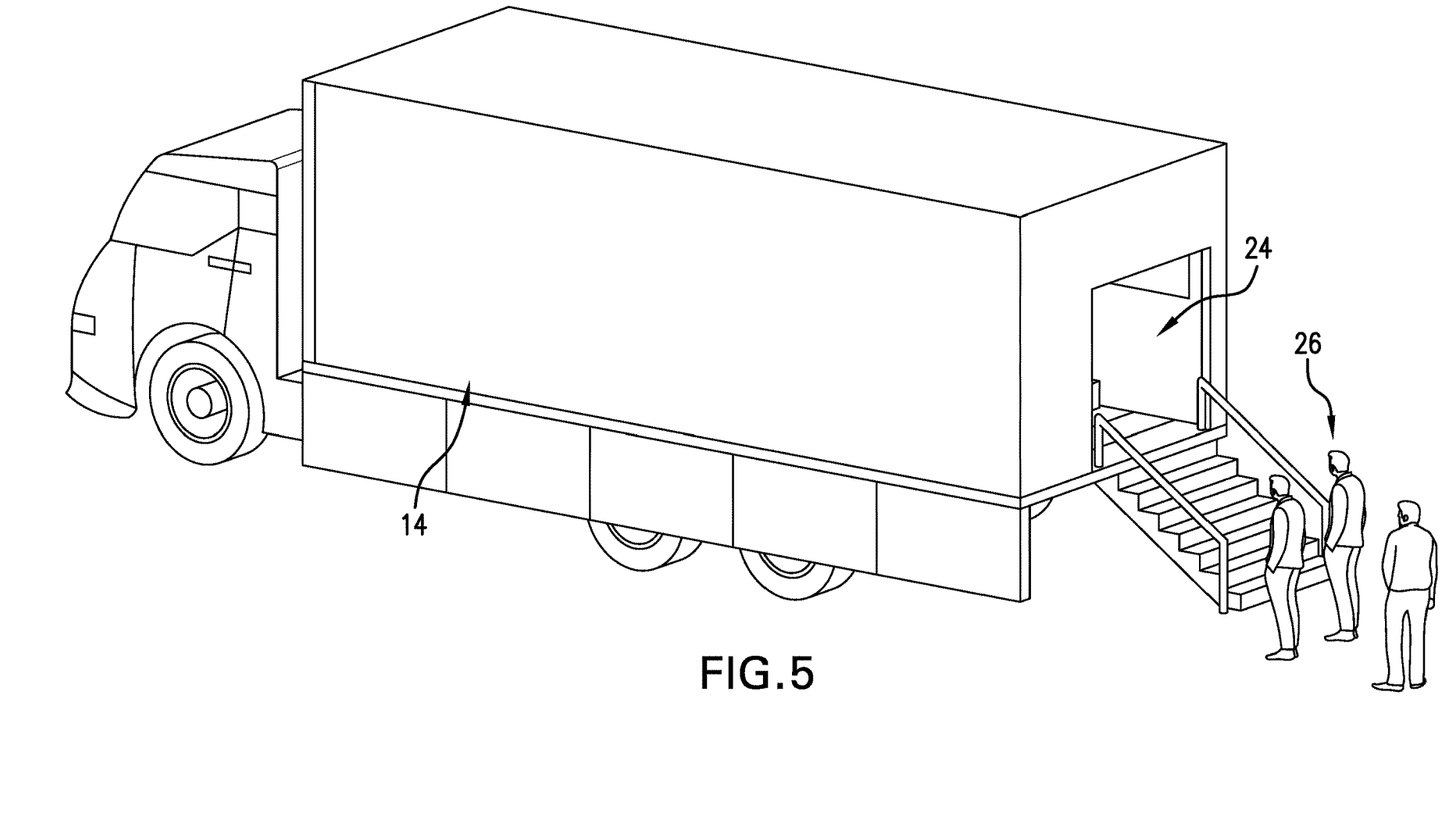
FIG. 5 is a schematic of the vehicle shown in FIG. 1 which highlights accessing the interactive experience offered in the trailer being, for example, at the rear of the trailer.

FIG. 5 shows an example of the vehicle of FIG. 1 as it might be used at a fairground or parking lot. The video wall 14 on the external part of the trailer may be able to show presentations to people waiting outside the vehicle, but also, a similar video wall can be positioned inside the trailer (shown in partial see through format) to provide information on safety and sustainability practices when people are inside the trailer. Access 24 to the interactive experience is at the rear of the trailer, and members of the public 26 which will see, hear and touch the demonstration materials and presentations may access the trailer using a stairway.

Figure 6:
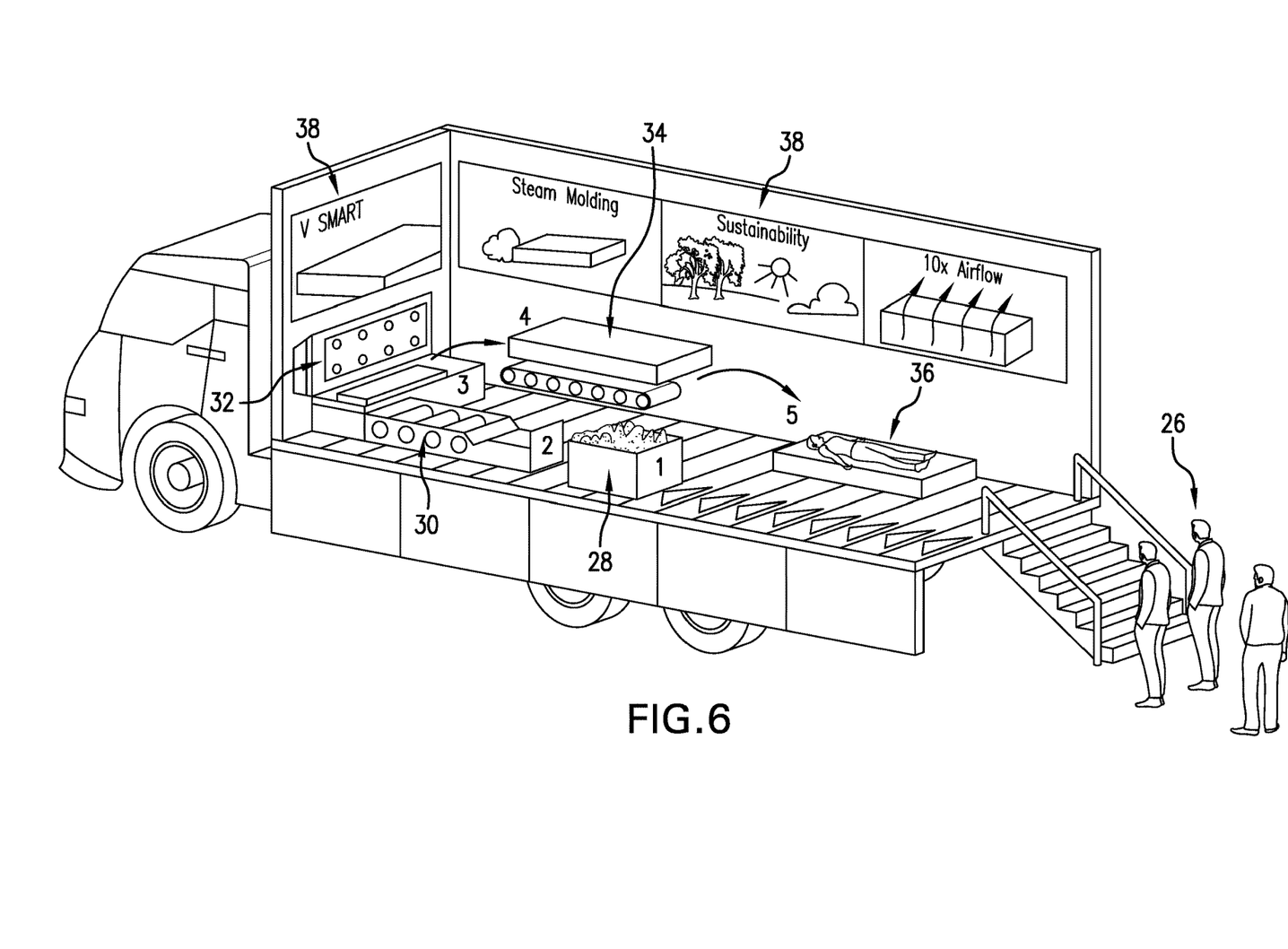
FIG. 6 is a cut-away schematic of the vehicle of FIG. 1 showing an example of how human subjects and display stations may be accommodated within the vehicle, and particularly shows an application for mattress production from recycled materials.

FIG. 6 illustrates an example of the mobile product manufacturing demonstration, apparatus and method in the context of mattress recycling and manufacturing. In a preferred embodiment, housed within the demonstration unit is a scale model, product manufacturing line where consumer products such as a mattress or other fiber-based products are produced. In the case of a mattress, the product would, by way of example and not to be limiting, be an assembly of vertically lapped polyester fiber layers (VLAP) that are thermally bonded together via infrared (IR) heater or other means of energy-efficient modes of heat transfer. The IR heater is preferably powered by photovoltaic panels.

In FIG. 6 it can be seen that the trailer of the vehicle can fit several human subjects 26. The embodiment of FIG. 6 has five interactive stations, and includes several video displays on the inside of the trailer. At the first station 28, raw recycled fibers can be seen and handled by the human subjects. The recycled fibers are obtained from mattresses and represent a ready for recycling condition of the mattress. The second 30 and third 32 stations demonstrate, for example, fiber cleaning and compaction, and steam molding, which are two processes which occur during recycling and product production. Depending on safety and other factors, the human subject may be able to touch and/or manipulate the scale model at the compaction 30 and steam molding 32 stations. The fourth station 34 presents a fully assembled mattress, thus demonstrating the post recycling condition of the product. At the fifth station 36, a person may lay on the mattress to feel how a mattress feels that is at least partially made with recycled fibers and/or other recycled materials.

The demonstration unit shall have a series of interactive product feature demonstrations units which can enable potential customers to directly interact with the product. Relative to the mattress example; although, not to be limited by it, it is envisioned that customer may be engaged in evaluations of pressure relief, airflow, thermal performance, etc. as compared to competitive technologies. These might take place at the fifth station 36 or at additional stations in the vehicle. If test evaluations are not practical, story boards, animation, videos and/or other means will be utilized to tell the story. As can be seen from FIG. 6, there may be a plurality of video display panels 38 inside the vehicle. These may provide information about the stations 28, 30, 32, and 34 where the consumer is interacting with the product at one stage of its life cycle, but they may also include information about the company and its sustainability practices (e.g., how it uses water, how and where it sources materials, etc.) as well as other information (e.g., how the mattress performs in terms of breathability, firmness, fire resistance, etc.).

Preferably, utilizing whatever means necessary, a product producer will use the mobile, interactive platform to show potential customers how the products are completely recyclable and can be reintroduced into raw material streams for new products. The mobile, interactive platform shows the consumer firsthand how a sustainable, environmentally responsible product can be produced. Moreover, other more primary sources of recyclable content such as polyester water bottles and the like will be shown as inputs to the raw material stream. End of product lifecycle may be demonstrated via shredding of the tired product and this may be accomplished on the vehicle using power obtained using photovoltaic panels on the roof of the vehicle trailer.

The product testing area at the fifth station 36 can be used by the human subjects to evaluate features, benefits and attributes of various products, such as the mattress, but possibly other products such as mattress toppers and pillows as discussed below in more detail by example. In some embodiments, this area may also be used to evaluate and/or compare competitor products relative to those which are being produced by the sponsor of the mobile, interactive, platform. For example, a competitors mattress might be positioned adjacent the sponsor's mattress made using the mobile, interactive, platform.

The video display panels 38, in addition to providing information to the audience about each of the stations, may also be used to provide information about the sponsor of the mobile, interactive, platform's environmental stewardship, and possibly a comparison to the stewardship of the sponsor's competitors. For example, the environmental footprint of the sponsor (and possibly competitors of the sponsor) could be computed, determined, or summarized, and present on the display in, for example, textual and/or graphical formats. Alternatively the environmental footprint (e.g., carbon footprint) could be presented only for specific products of the sponsor (and competitors of the sponsor).

Figure 7:
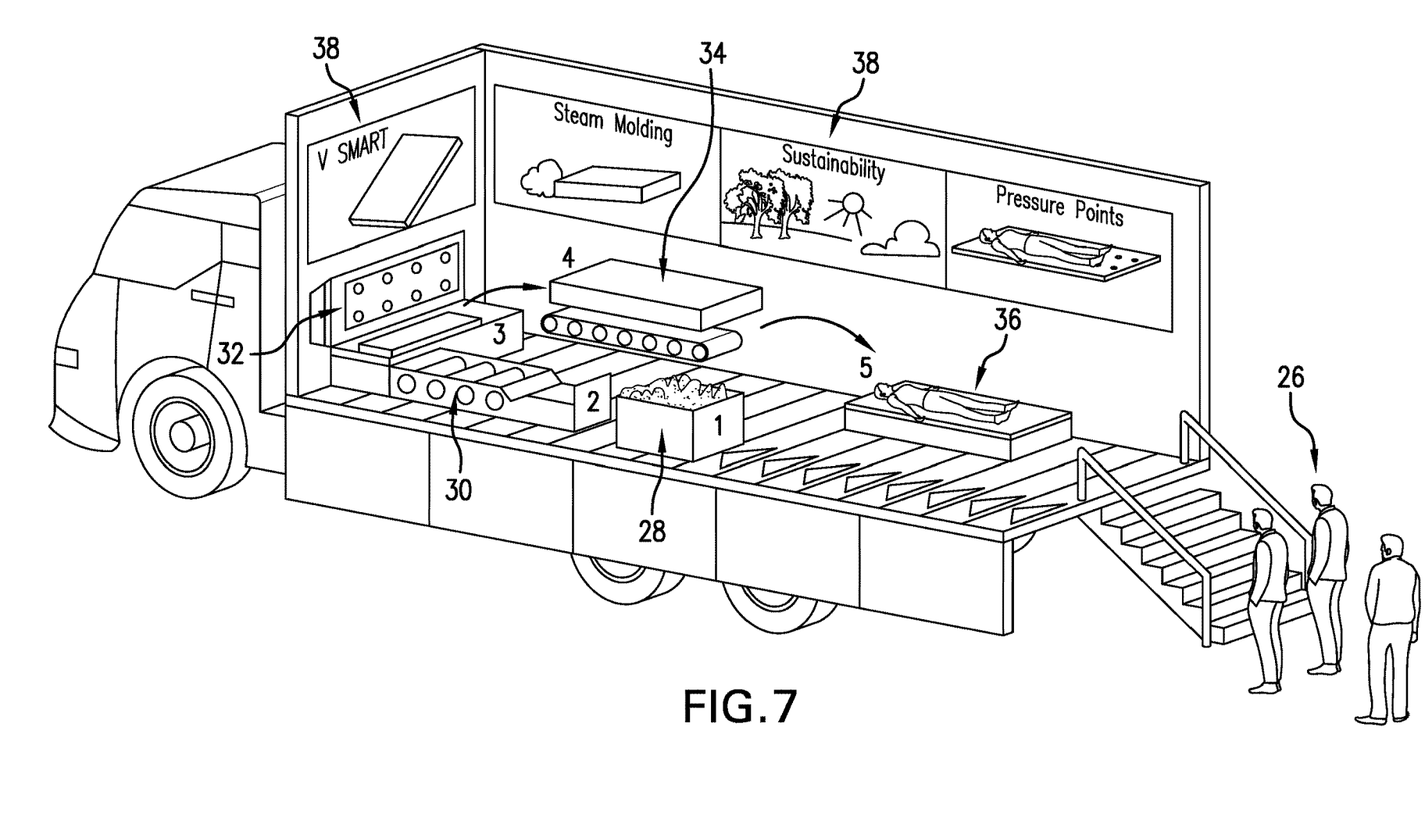
FIG. 7 is a cut-away schematic nearly identical to FIG. 6, except that it shows the production of mattress toppers from recycled materials.

Many customers use mattress toppers on their mattress (e.g., quilted and/or cushioned tops) to improved support, breathability, etc. FIG. 7 shows a system nearly identical to that depicted in FIG. 6, but for mattress toppers. This is because a number of the materials used in mattress manufacturing and mattress topper manufacturing are the same, particularly including fire resistant barriers, fibrous materials, other cushioning materials, etc. An advantage of the mobile, interactive, platform of FIG. 7 is that the product takes less room than a mattress, and it may be possible to sell mattress toppers that are manufactured within the mobile, interactive, platform to customers and/or give away samples produced in the mobile, interactive, platform.

Figure 8:
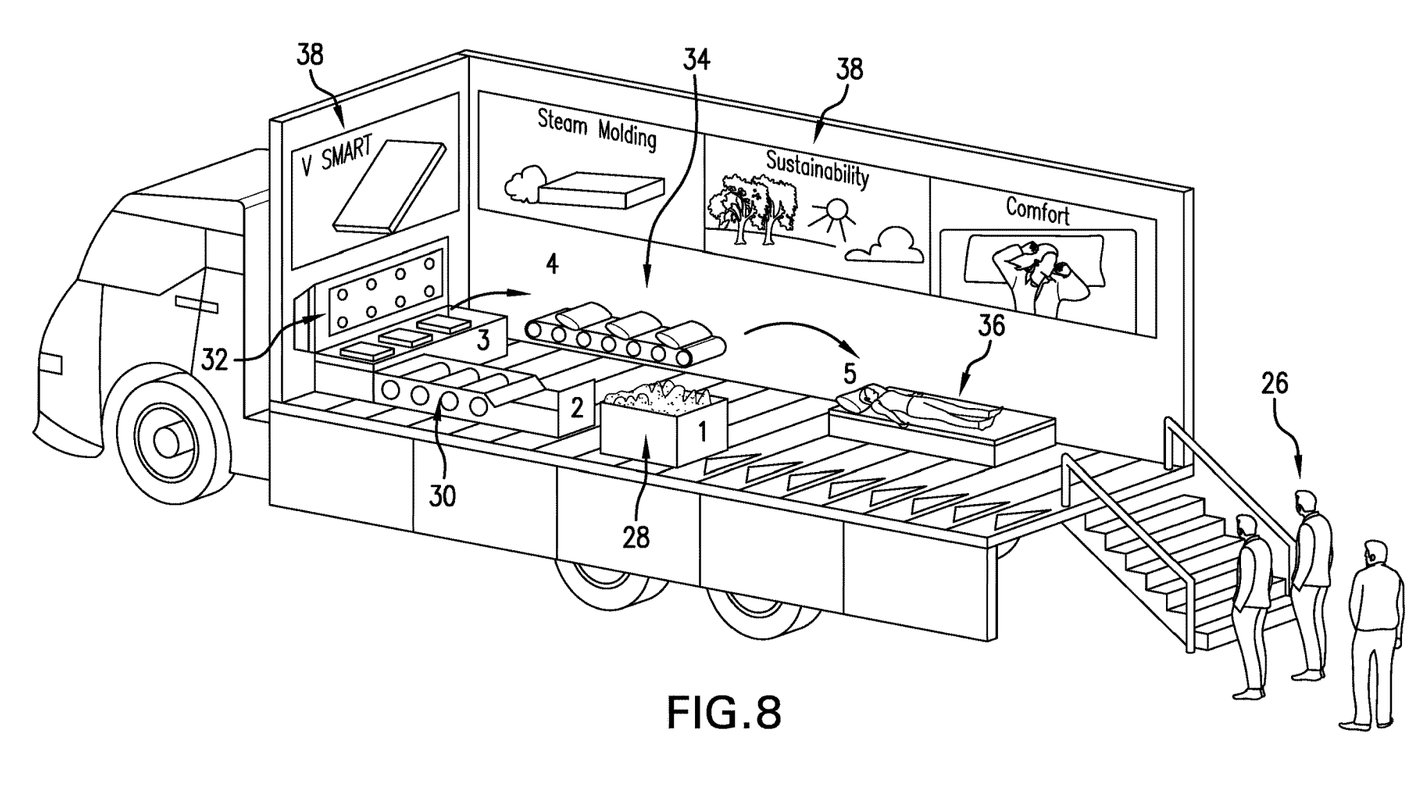
FIG. 8 is a cut-away schematic nearly identical to FIG. 6, except that it shows the production of pillows from recycled materials.

FIG. 8 is similar to FIGS. 6 and 7 and shows the production of pillows from recycled materials. As with FIGS. 6 and 7, many of the display stations may be the same as shown in FIG. 8 because many of the materials being recycled and reused in finished products are the same (e.g., fibers, fire resistant barriers, etc.). As with mattress topper recycling as shown in connection with FIG. 7, pillows made in the mobile, interactive, platform may be sold to members of the public at the vehicle, and/or samples of finished product may provided to the public which participates in the interactive demonstration.

Figure 9:
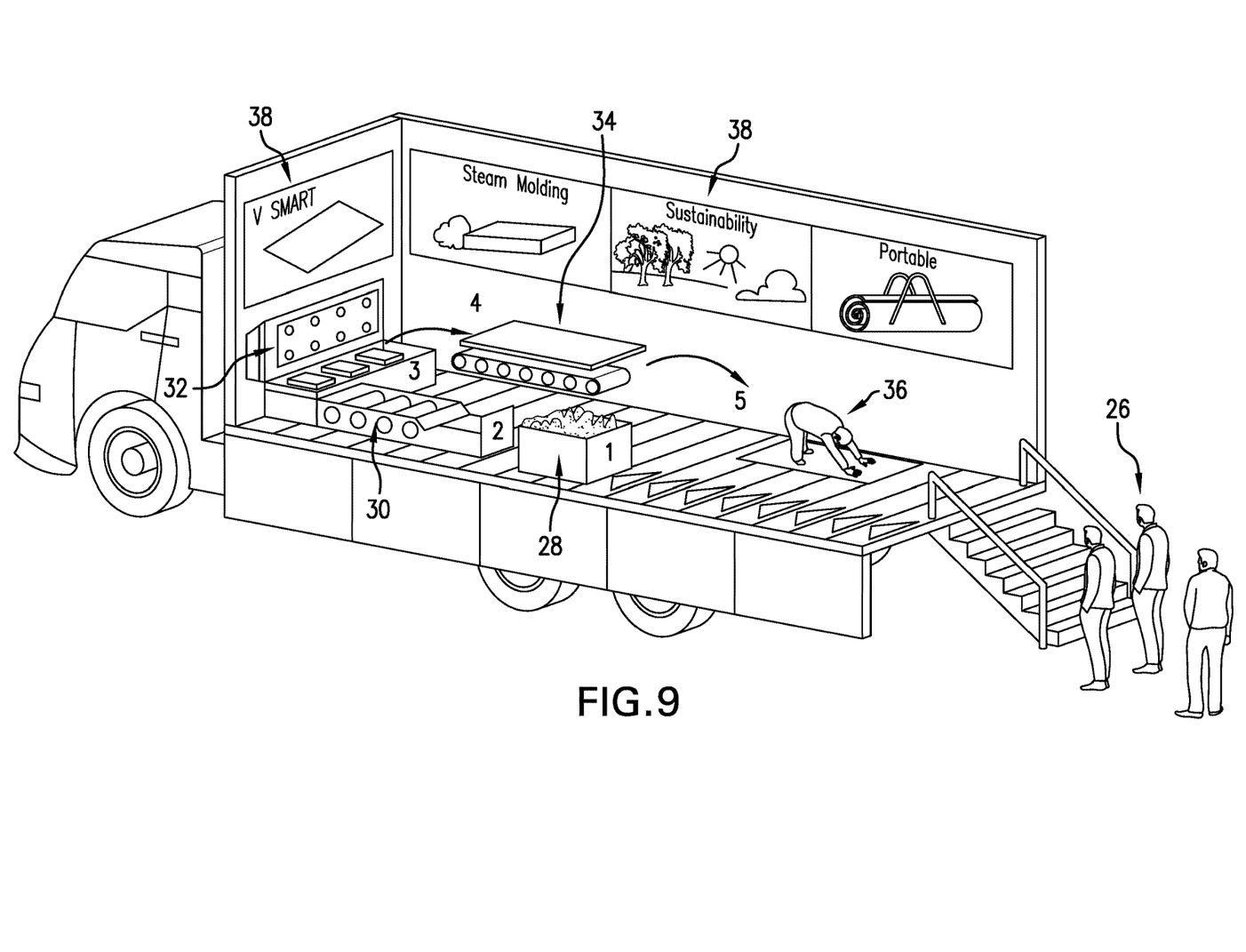
FIG. 9 is a cut-away schematic nearly identical to FIG. 6, except that it shows the production of yoga mats from recycled materials.
Figure 10:
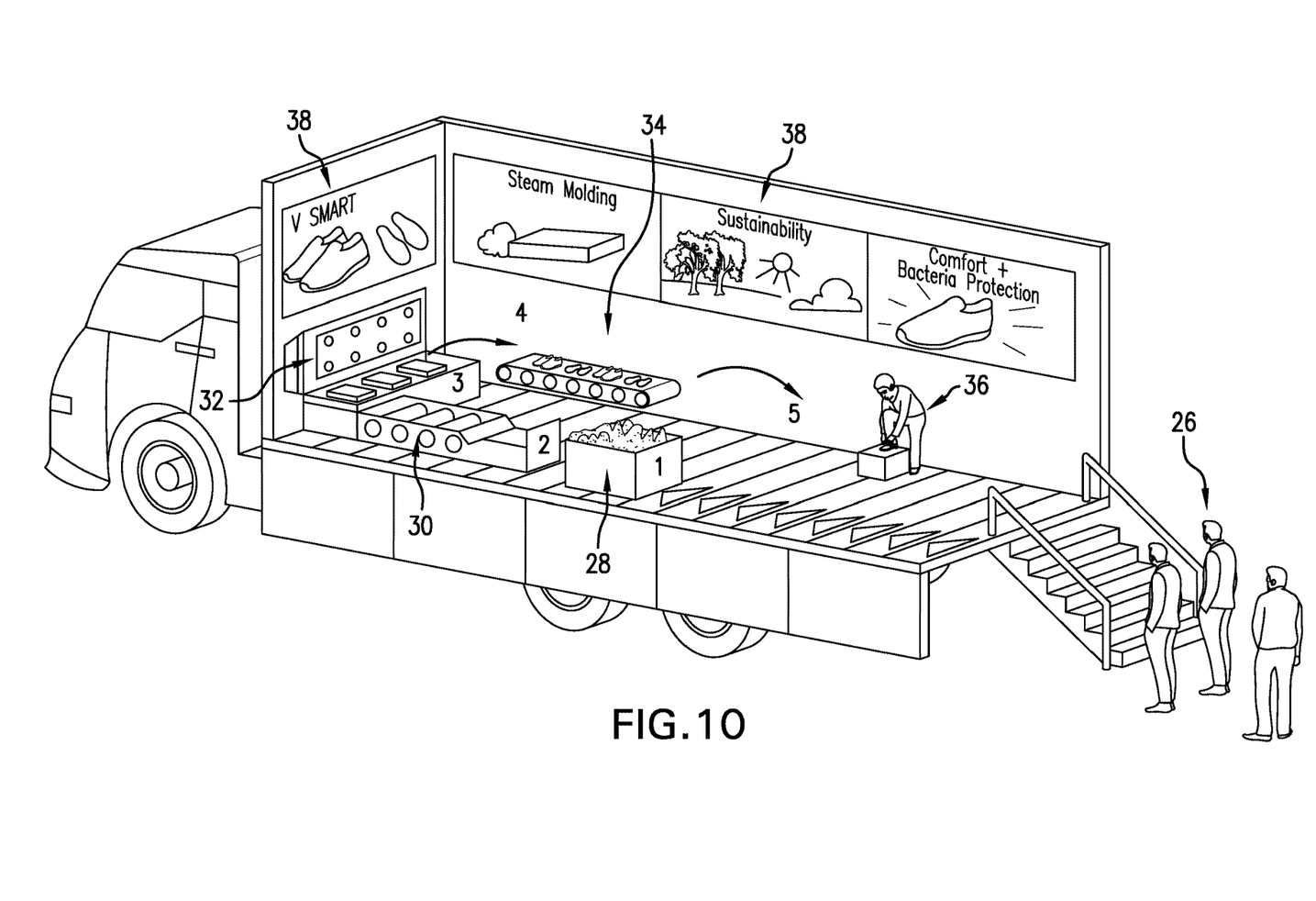
FIG. 10 is a cut-away schematic nearly identical to FIG. 6, except that it shows the production of shoes from recycled materials.

FIGS. 9 and 10 are similar to FIGS. 6-8, and show that the interactive system and method can be used for a wide variety of products which may be manufactured using recycled parts or components, in particularly respectively including yoga mats and shoes. Generally speaking raw fibers and other materials may be compacted, molded, and produced as an environmentally friendly product in a variety of forms. FIG. 9 shows that yoga mats might be tested on board the vehicle, and then may be sold to individual customers or samples could be provided to the customers which participated in the demonstration. FIG. 10 shows that customers could try on shoes and/or show insoles produced in the interactive demonstration vehicle. As discussed above, customers might also be able try on competitors shoes or shoe insoles for comparison purposes. A mobile, interactive, platform for shoe production or shoe insole production might involve having different molds for different sized shoes or shoe insoles at molding station 3. As with the other examples, the customer could purchase the shoes produced in the mobile, interactive, platform and/or sample materials could be provided to the people that participated in the demonstration.

The overall environmental impact of the process including a carbon footprint analysis will be shared and celebrated as compared to other more typical manufacturing methods that are heavily reliant upon ozone-depleting petrochemicals and the resultant products that contain little-to-no recyclable content. Examples of such are polyurethane foam-based products such as a memory foam mattress.

The invention claimed is:

1. A mobile, interactive, platform for demonstrating production of products with minimized environmental impact, comprising:
   a vehicle having a display area which accommodates a plurality of display stations and a plurality of human subjects,
      wherein said vehicle is at least partially powered by one or more of batteries, solar, electric motors, hydrogen fuel cells, and biodiesel;
      wherein the display area of the vehicle is accessible by the plurality of human subjects; and
   a plurality of display stations in the display area of the vehicle which show for at least one product a ready for recycling condition of the at least one product, a during recycling condition of the least one product, and a post recycling condition of the at least one product,
      wherein at least one display station of the plurality of display stations is interactive and is configured to permit at least one of the plurality of human subjects to touch and/or manipulate one or materials or components of the at least one product in its ready for recycling condition, during recycling condition, and post recycling condition.

2. The mobile, interactive, platform of claim 1 wherein each of the plurality of display stations is configured to permit at least one of the plurality of human subjects to touch and/or manipulate one or more materials or components of the at least one product in its ready for recycling condition, during recycling condition, and post recycling condition.

3. The mobile, interactive, platform of clam 1, wherein the vehicle is partially powered by batteries, and the batteries are at least partially charged by solar energy using photovoltaic cells connected or connectable to the vehicle.

4. The mobile, interactive, platform of claim 1 wherein the at least one product is a mattress, mattress topper, or pillow and wherein the ready for recycling condition includes reclaimed fibers, wherein the recycling condition includes separated fibers, and wherein the post recycling condition includes an assembled mattress, mattress topper, or pillow.

5. The mobile, interactive, platform of claim 4 wherein the recycling condition includes a partially assembled mattress.

6. The mobile, interactive, platform of claim 4 wherein the configuration of the assembled mattress, mattress topper, or pillow permits one or more of the plurality of human subjects to lay on the assembled mattress, mattress topper, or pillow.

7. The mobile, interactive, platform of claim 1 wherein the at least one product is a shoe, and wherein the ready for recycling condition includes torn apart shoe parts, wherein the recycling condition includes separated fibers, rubber, or plastic, and wherein the post recycling condition includes an assembled shoe and/or an assembled insole which fits in a shoe.

8. The mobile, interactive, platform of claim 1 wherein the at least one product is a yoga mat, and wherein the ready for recycling condition includes reclaimed fibers and/or torn apart rubber materials, wherein the recycling condition includes separated fibers, rubber, or plastic, and wherein the post recycling condition includes an assembled yoga mat.

9. The mobile, interactive, platform of claim 1 further comprising one or more video display areas configured to provide video information to the plurality of human subjects.

10. The mobile interactive platform of claim 9, wherein at least one of the one or more video display areas is on an outside of the vehicle separate from the plurality of display stations.

11. The mobile interactive platform of claim 9, wherein at least one of the one or more video display areas is on an inside wall of the vehicle together with the plurality of display stations.

12. The mobile, interactive, platform of claim 9 wherein at least one of the one or more video displays, presents information pertaining to a carbon footprint.

13. The mobile, interactive, platform of claim 12 wherein the information includes comparative information of carbon footprints of a plurality of competitors, a plurality of different production practices, and/or the carbon footprints of particular products.

14. The mobile, interactive, platform of clam 1 wherein the vehicle is selected from the group consisting of a bus, a van, a recreational vehicle, pick up truck, ten wheel truck, and semi-truck.

15. The mobile, interactive, platform of claim 1 wherein at least one display station permits testing and evaluation of at least one product.

16. The mobile, interactive, platform of claim 1 wherein the at least one product includes a plurality of products made by different competitors and/or by different production practices.

* * * * *